UNITED STATES PATENT OFFICE.

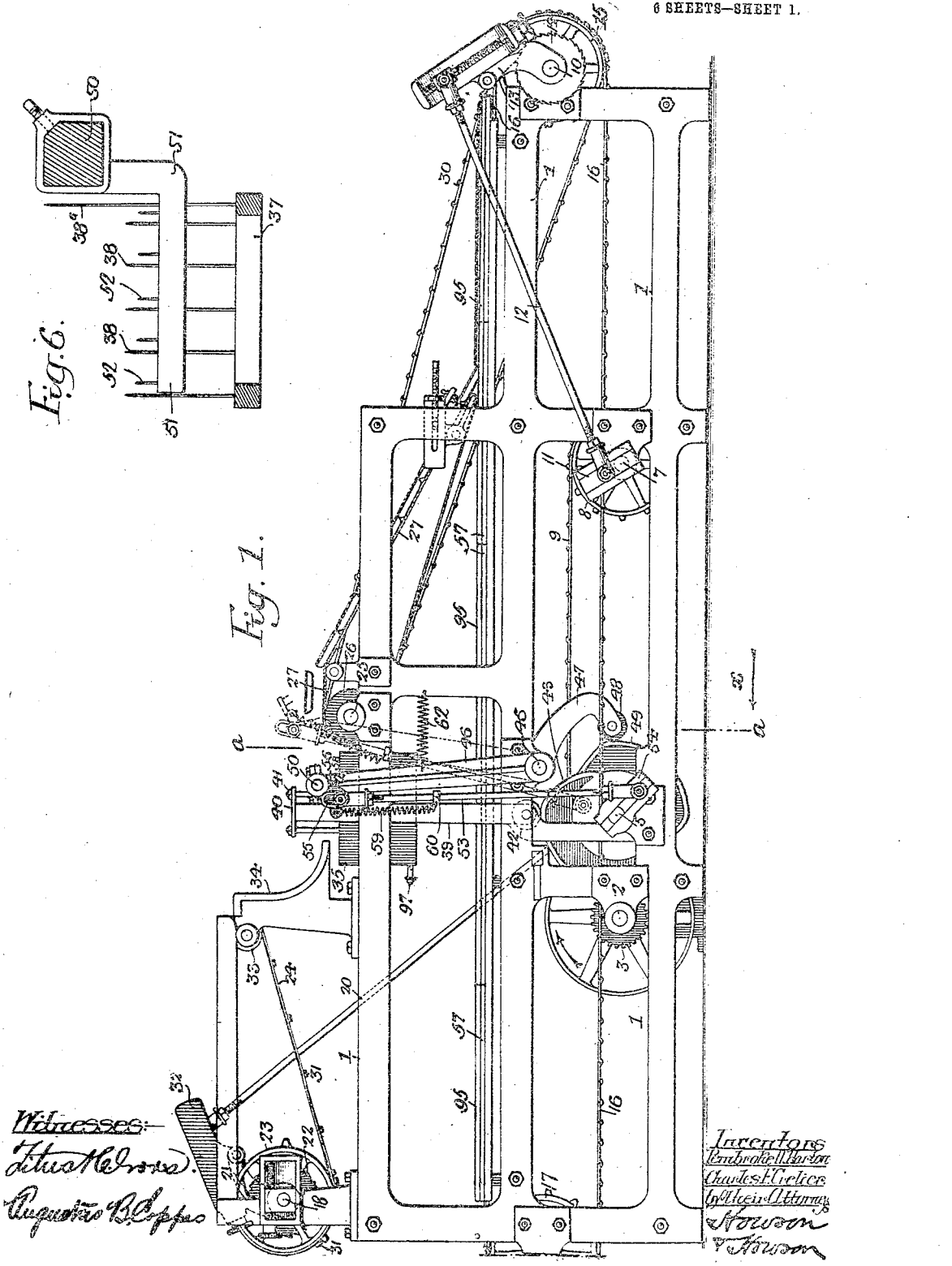

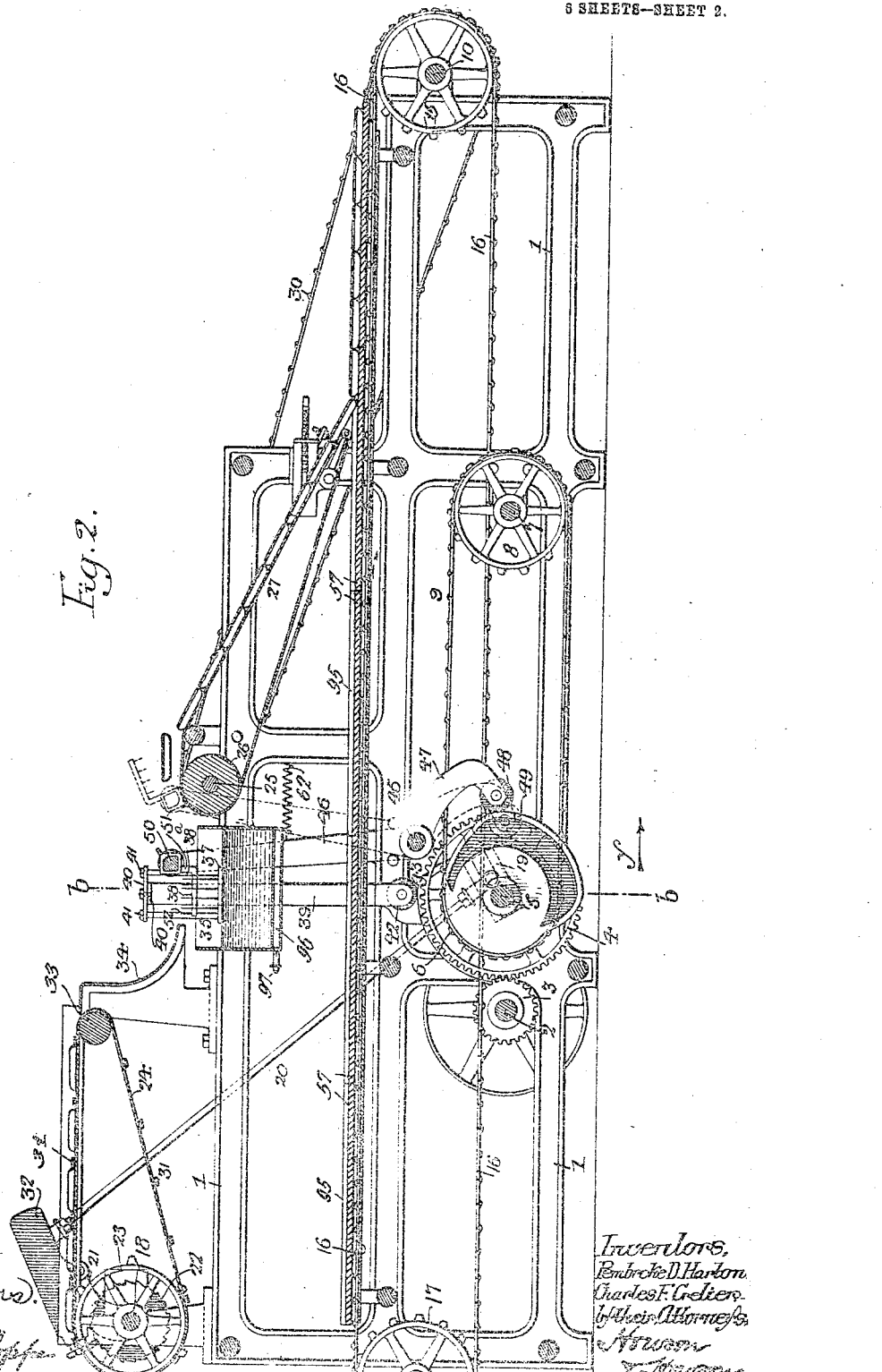

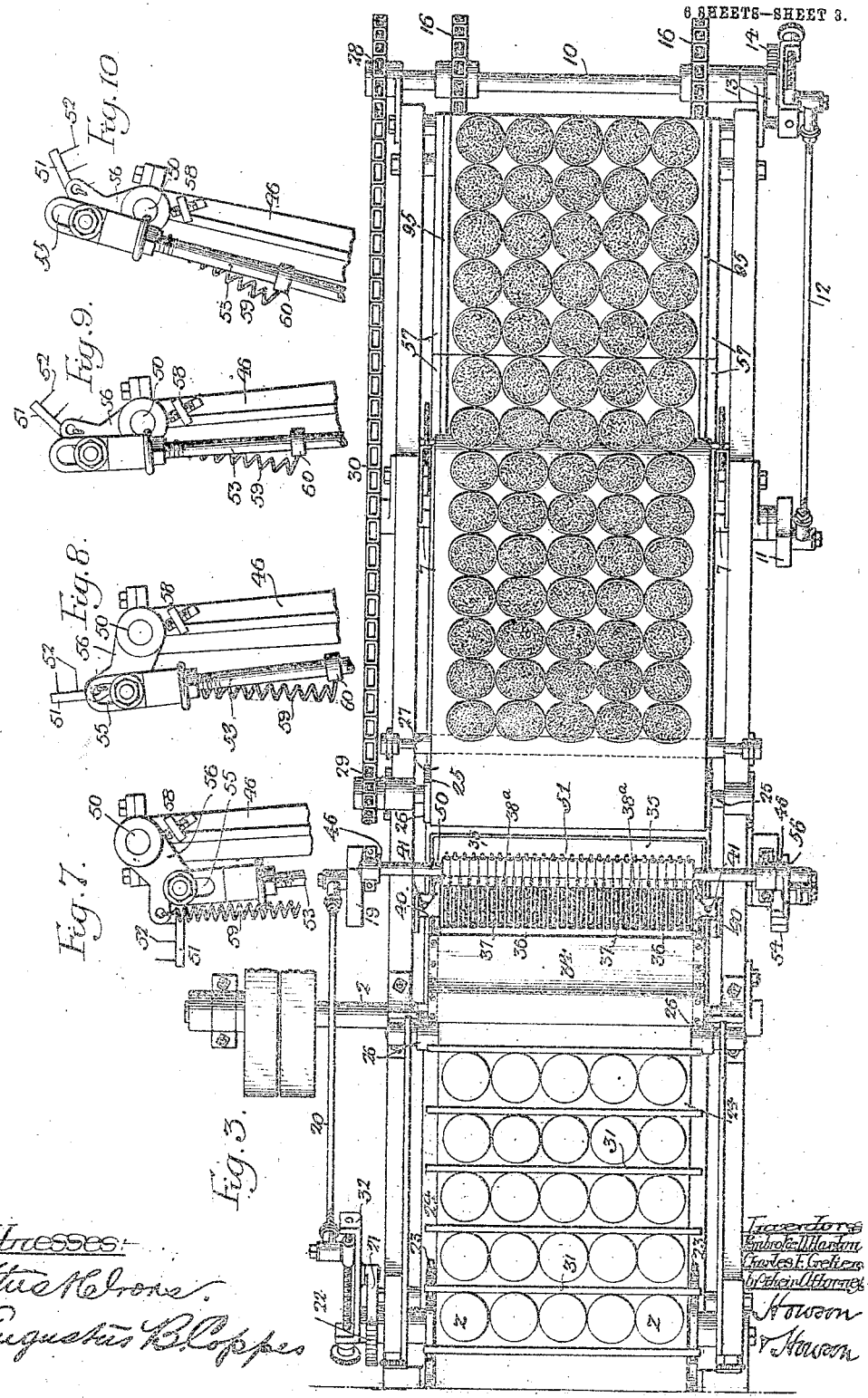

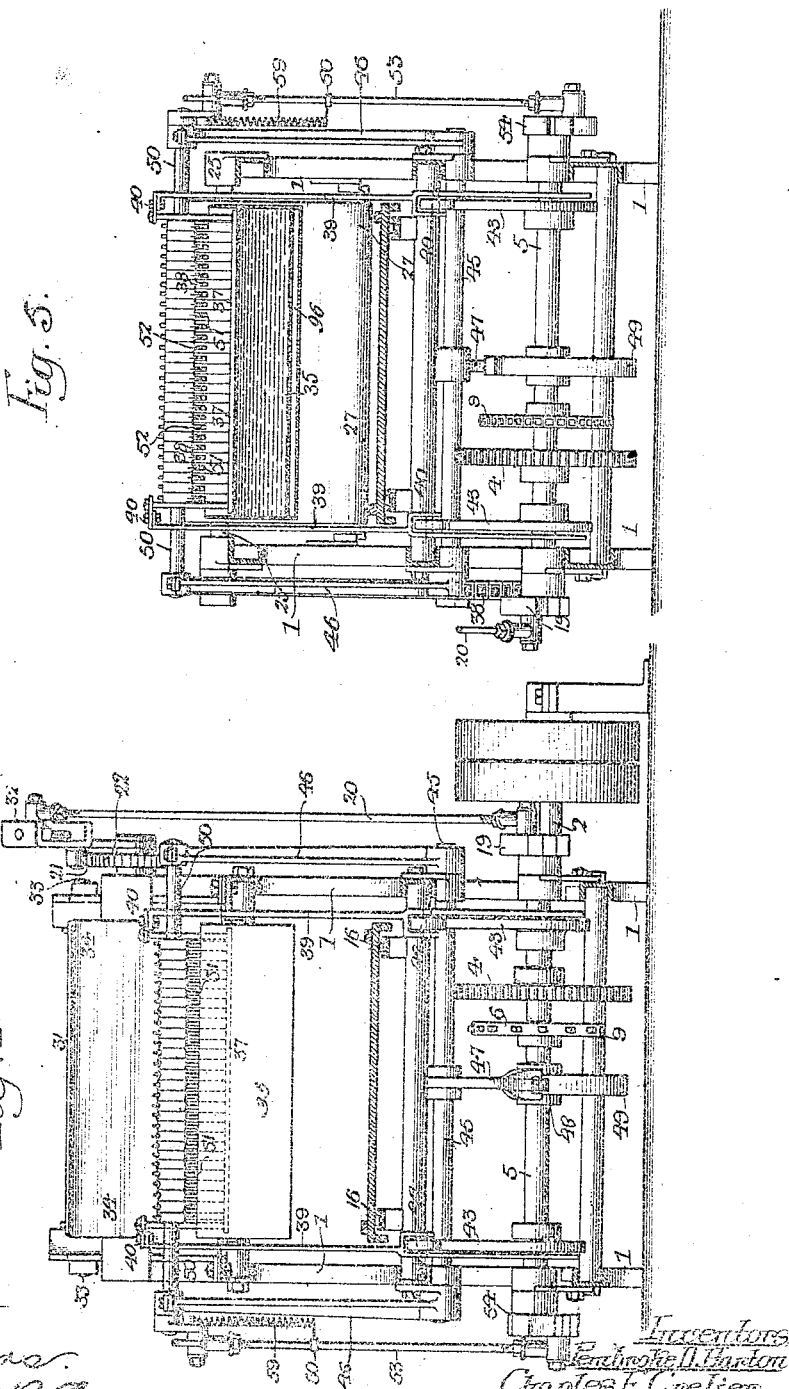

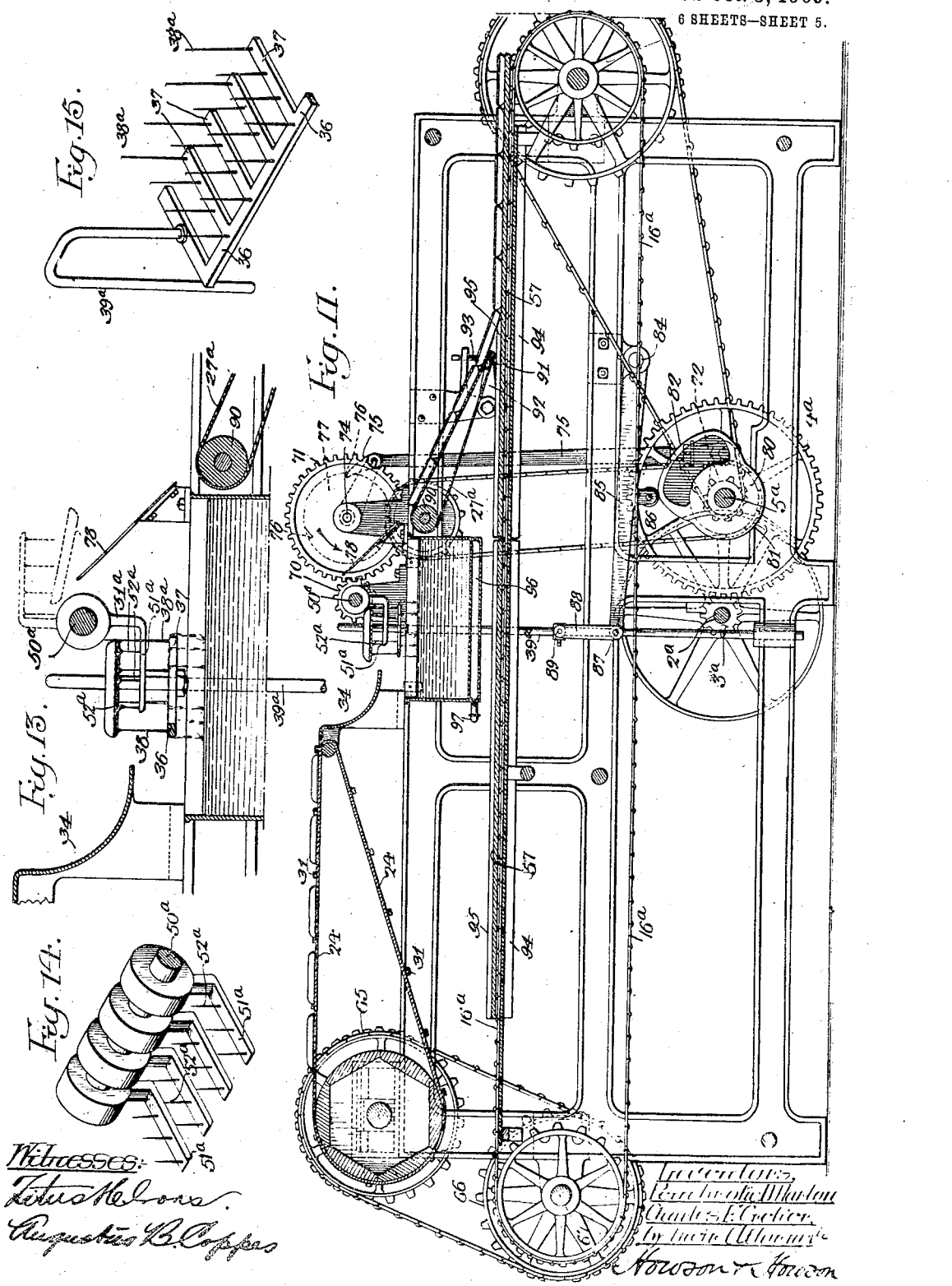

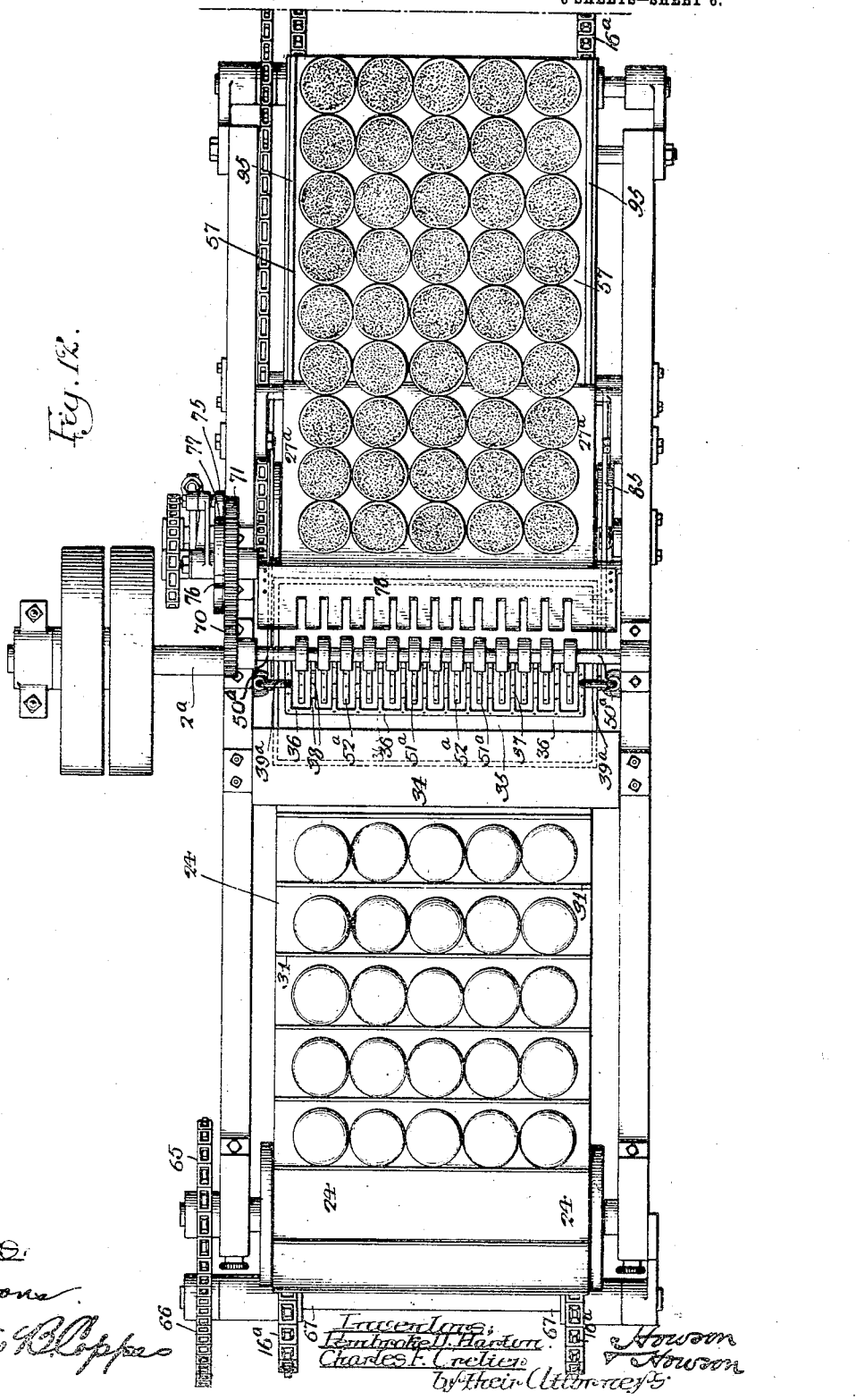

PEMBROKE D. HARTON, OF PHILADELPHIA, AND CHARLES F. CRELIER, OF PITTSBURG, PENNSYLVANIA.

CAKE-COATING MACHINE.

935,975. Specification of Letters Patent. Patented Oct. 5, 1909.

Application filed February 10, 1908. Serial No. 415,155.

*To all whom it may concern:*

Be it known that we, PEMBROKE D. HARTON and CHARLES F. CRELIER, citizens of the United States, and residents of Philadelphia and Pittsburg, Pennsylvania, respectively, have invented certain Improvements in Cake-Coating Machines, of which the following is a specification.

Our invention relates to machines for coating flat cakes, biscuits and other similar articles with icing, jelly and other material of a sticky nature; and the object of our invention is to provide simple and efficient means for mechanically performing this work so as to avoid handling the cakes from the time they are placed upon a feeding apron until they are removed from boards or receptacles carried by suitable chain conveyer belts, such boards being arranged to receive the coated cakes as they are delivered from the coating means and upon which they may dry or become set.

Our invention is fully shown in the accompanying drawings, in which:

Figure 1, is a side elevation of a machine embodying our invention; Fig. 2, is a sectional elevation of the same; Fig. 3, is a plan view; Fig. 4, is a cross-sectional view, taken on the line *a—a*, Fig. 1, looking in the direction of the arrow *x;* Fig. 5, is a cross-sectional view, taken on the line *b—b*, Fig. 2, looking in the direction of the arrow *y;* Fig. 6, is a view illustrating a detail of the structure shown in Figs. 1 to 5, inclusive; Figs. 7, 8, 9 and 10, are diagrammatic views of a detail of our invention; Fig. 11, is a sectional elevation of a modified structure embodying our invention; Fig. 12, is a plan view of the same, and Figs. 13, 14 and 15, are views illustrating details of the structure shown in Figs. 11 and 12.

In Figs. 1 to 10, both inclusive, we have shown one form of machine embodying our invention, while in Figs. 11 to 15, both inclusive, we have shown another form of machine illustrating a modification within the scope of our invention.

In each instance, the mechanism forming the subject of our invention is carried by a suitable frame comprising side members 1 properly secured together and provided with journal bearings for the necessary shafts, upon which shafts are mounted belt, chain and ratchet wheels employed in effecting the necessary movements in the operation of such mechanism.

In the machine illustrated in Figs. 1, 2, *et seq.*, 2 represents the main driving shaft having a pinion 3 meshing with a gear wheel 4 mounted on a counter shaft 5 which carries a series of cams to be hereinafter described. The shaft 5 carries a chain wheel 6 by which a shaft 7 is driven through the medium of a chain wheel 8 and chain 9. From the shaft 7, movement is imparted intermittently to a shaft 10 by means of a crank 11, connecting rod 12, pawl 13 and ratchet wheel 14, said shaft carrying chain wheels 15 around which a conveyer belt 16 passes; said belt passing around idler chain wheels 17 at the opposite end of the machine. From the shaft 5 intermittent movement is also imparted to a shaft 18 by means of a crank 19, connecting rod 20, pawl 21 and ratchet wheel 22 secured to said shaft. This shaft carries toothed wheels 23 for a feeding apron or belt 24. A shaft 25 carrying a roller 26 for a delivery belt 27 is also driven from the shaft 10, by means of the chain wheels 28 and 29, and chain 30.

The cakes, indicated at *z* are placed on the feeding apron or belt 24, by hand or by other means, said belt having division strips 31 projecting at each side, the teeth of the wheels 23 engaging the projecting portions of these strips. The shaft 18 is driven intermittently by the connecting rod 20 carried by the crank 19 on the end of the shaft 5, said rod being connected to an arm 32 pivotally mounted on the shaft 18, carrying the pawl 21 in engagement with the ratchet wheel 22 carried by said shaft. The connection between the rod 20 and the crank 19, and between the rod and said arm 32 is adjustable so as to vary the throw of the pawl and regulate the feed of the belt or apron 24. The delivery end of this belt passes around a small roll 33 which insures the easy delivery of the cakes therefrom, and the strips 31 provide for a uniform discharge of the same. From the belt or apron 24 the cakes pass to a chute 34 extending the full width of the machine, onto which they are pushed by cakes in the rear. Directly below the chute is an icing tank 35 into which the cakes slide from the chute or are pushed by the succeeding cakes. Arranged to reciprocate vertically within this tank is a frame 36 having a series of arms 37, with pins or pickers 38 projecting vertically from the same, and when the cakes pass onto the surface of the icing, these pins are normally below the same. This pin or picker frame is carried by a pair of rods 39, vertically movable with respect to the frame of the machine and guided by suitable means. To move these rods and thereby vertically reciprocate the frame within the icing, the following means are employed: The rods 39 carrying the pin or picker frame 36 are connected therewith by means of a cross-piece 40 secured to said rods and frame by suitable bolts 41. Anti-friction rollers 42 are carried by these rods in engagement with cams 43 for operating the same mounted on the shaft 5, such cams being so disposed that the rods will start to lift the pin or picker frame 36 just after a row of cakes drop onto the surface of the icing bath. To prevent the cakes floating across the icing bath out of the proper range of the pins or pickers carried by said frame, the latter carries a series of longer pins 38ª which project above the surface of the icing when the frame is in the lowered position and against which the cakes may strike if they cross the icing bath. When the frame is carried up by the rods 39, the pins 38 of the same lift the cakes free of the icing ready to be engaged by turning means for discharge onto the delivery belt 27.

The turning means of the structure illustrated in Figs. 1, 2, et seq., are as follows: Secured to a rock shaft 45 journaled in the frame of the machine are levers 46, and also secured to said rock shaft and extending below the levers is a curved arm 47 having an anti-friction roller 48 in engagement with an operating cam 49 on the shaft 5. The upper ends of these levers carry a rock shaft 50 having a series of arms 51 with pins 52 and these arms are arranged to be projected into the path of and directly below the cakes carried by the pins 38 of the frame 36, by means of said cam 49. Immediately the pins on said arms 51 reach a point beneath said cakes, the rock shaft 50 carrying said arms 51 is turned by means of a connecting rod 53 carried by a crank arm 54 on said shaft 5, and having a slotted connection 55 with a crank arm 56 on the end of said rock shaft. As the rock shaft is turned by the movement of the connecting rod, the lever 46 is moved by a spring away from the frame 36 and when the arms reach a point where the cakes can drop from the same they are entirely free from the frame 36 and the cakes are in position to be delivered to the belt 27 from which they slide onto boards or receptacles 57 carried by the traveling conveyer chain belts 16.

It will be noted that the arms for removing the cakes from the pins or pickers of the icing tank frame have a double movement imparted to them, being reciprocated by the lever and oscillated by the connecting rod, in addition to being maintained substantially at rest between such movements. The diagram views, Figs. 7, 8, 9 and 10, illustrate the movement of said arms.

The dwell in the semi-rotary or oscillating movements of the rock shaft 50 carrying the arms 51 is obtained by the use of the slotted connection 55 which allows an elongation of the connecting rod 53 and changes its point of operative engagement with the crank arm 56 on the rock shaft 50 carrying said arms 51. When the crank arm 56 of the rock shaft 50 has been stopped by an adjustable lug 58 on the lever 46, a spring 59 having its upper end secured to said crank and its lower end to a collar 60 on the connecting rod 53, will hold the rock shaft 50 carrying the arms 51 in the lowest position while the crank arm 54 is passing a portion of its revolution.

The reciprocating movement is obtained or accomplished by the engagement of the cam 49 with the curved arm 47 carried by the rock shaft 45, said rock shaft also carrying the levers 46, in the upper ends of which the oscillating rock shaft 50 with the pin arms 51, is journaled. The curved arm 47 is held in engagement with the cam 49 by means of springs 62 secured to the levers 46 and the frame of the machine. When the frame within the icing tank has been lifted to the proper height, raising the cakes on the pins or pickers of the same, the arms 51 of the rock shaft 50 carrying the pins or pickers 52, is projected under said cakes and simultaneously lifted, carrying such cakes to the position shown and depositing them on the delivery belt 27, such apron being operated intermittently, consonant with the operation of the other elements of the machine. The operation of the machine is continuous, the operative parts being driven intermittently.

In the structure shown in Figs. 11 and 12, a feeding belt, delivery chute, icing tank and pin lifter for the cakes, working in said tank are employed of substantially the same construction as those in the structure shown in Figs. 1, 2, et seq., the driving mechanism, however, providing for continuous feed and movement of the other parts of the machine instead of an intermittent movement. The means for operating the pin lifter in the icing tank are different, however, as well as the means employed for turning the cakes; such mechanism being organized and operating as follows:

The main driving shaft of the machine is indicated at 2ª, and drives by means of the pinion gear wheels 3ª and 4ª, a counter shaft 5ª. From said counter shaft an endless conveyer belt 16ª is driven, and also the inclined belt 27ª which receives the iced cakes and delivers them to the carrying boards or receptacles 57. The conveyer belt passes over pulleys at each end, and the feed apron or belt 24 of the machine is driven by means of a chain passing over its chain wheel 65 from a similar chain wheel 66 carried by the shaft 67 for the wheels of the conveyer belt 16ª. A shaft 50ª carrying a series of arms 51ª having pins 52ª is arranged to lift the cakes from the pins or pickers of the frame 36 working in the icing receptacle and this shaft is driven by means of a pinion 70 thereon meshing with a gear wheel 71. The gear wheel is driven by means of a crank 72 carried by the counter shaft 5ª and a crank arm 73 carried by a shaft 74; said crank and arm being connected by a suitable rod 75, and the arm 73 carrying a pawl 75 engaging the teeth 76 of a ratchet wheel 77 fixed adjacent to and turning with said gear wheel 71. Three such teeth are provided, and the movements of said arm will be in three stages; viz., picking up the cakes and moving them to a point above the shaft carrying said arm; depositing the cake on the inclined chute 78 and then bringing the arm into position to again engage the cakes. The chute 78 is slotted for the passage of the arms. In this structure, the counter shaft 5ª driven from the main shaft 2ª, carries a suitable cam 80, having dwells 81 and 82, the lower dwell 81 providing for the maintenance of the pin or picker frame 36 within the icing bath and below the surface of the icing therein until the cakes are dropped onto such surface, while the high dwell provides for the holding of the frame out of the bath until the cakes are removed from the pins carried by the same. Pivoted at 84 to the frame of the machine, is an arm 85 having an anti-friction roller 86 adapted to engage the cam 80; the opposite end of said arm being hinged at 87 to a link 88 pivotally connected at 89 to the vertical arms 39ª carrying the pin frame 36, and by this means said frame is raised and lowered within the icing bath.

The cakes as raised by the frame within the icing bath with the iced face lowermost, are to be lifted from the pins carried by said frame, turned over and then discharged onto an inclined delivery belt 27ª, from which they pass onto suitable boards carried by the endless conveyer, being thence conveyed away to a packaging point. The means for lifting the cakes from the pins of said frame comprise the arms 51ª mounted on the shaft 50ª and driven in the manner described; such arms being arranged to wipe between the arms of the frame working in the icing bath and carrying pins to lift the cakes therefrom; the weight of the cakes causing them to be partially impaled on said pins so that they will be held sufficiently firm until said arm turns over and is in position to deposit them. In this form of structure, the cakes are deposited upon the inclined plate 78 from which they pass to the delivery belt or apron 27ª which passes over a drum 90 and a narrow bar 91; the latter being carried by a pivoted arm 92 vertically adjustable by means of the screw 93, and thence onto the boards 57 carried by the endless belt. In each form of the machine, these boards or receptacles are fed onto said belt at the front end of the machine.

The boards 57 are provided with depending edges 94 to keep them in place on the conveyer belt and also to enable them to be piled without damage to the cakes. They also have guard strips 95 on the upper surface to prevent the cakes sliding off.

The icing receptacles have a double bottom 96, to which steam or hot water may be admitted by the pipes 97 to maintain the contents in a proper fluid condition.

We claim:

1. The combination, in a cake coating machine, of means for depositing cakes directly upon the surface of an icing bath, means movable within the icing for lifting said cakes from the surface of the same, and means for taking said cakes from the lifting means and depositing them upon a conveyer with the iced face uppermost.

2. The combination, in a cake coating machine, of means for depositing cakes directly upon the surface of an icing bath, means movable within the icing for lifting said cakes from the surface of the same, means for removing said cakes from the lifting means and depositing them with their iced face uppermost upon a conveyer, and means for actuating said removing means to advance beneath the cakes, lift the same, retract and then turn, substantially as described.

3. The combination, in a cake coating machine, of cake feeding means, provision for floating said cakes on the surface of an icing bath, means within the icing bath for lifting said cakes from the surface of the same, and means for removing said cakes from the lifting means, turning them, and then depositing said cakes upon a conveying belt.

4. The combination, in a cake coating machine, of means for feeding cakes, provision for floating them on the surface of an icing bath, pin frames within the icing bath for lifting said cakes from the surface of the same, means for operating said pin frames, and means for removing the cakes from said pin frames, said removing means serving to turn and deposit the cakes with the iced face uppermost upon conveying means.

5. The combination, in a cake coating machine, of means for feeding cakes, a receptacle for icing upon the surface of which icing said cakes may float, means within the icing for lifting said cakes from the surface of the same, and means moving in the arc of a circle for removing said cakes from the lifting means and turning them.

6. The combination, in a cake coating machine, of means for feeding cakes, a receptacle for icing to the surface of which icing said cakes are delivered, means within said icing receptacle for lifting the cakes from the surface of icing within the same, means for operating said lifting means, and means moving in the arc of a circle for removing said cakes from the lifting means, turning them and dropping them onto a conveyer.

7. The combination, in a cake coating machine, of a feeding belt having means whereby the cakes are spaced equidistant apart when fed, a receptacle for icing to the surface of which icing said cakes are fed, a frame disposed within said icing receptacle and having pins normally below the surface of the icing when the cakes are fed thereto, means for raising said frame whereby the pins carried thereby will lift the cakes, a chute, and an arm arranged to reciprocate in a semi-rotary or oscillating path and having pins for removing the cakes from the lifting means within the icing receptacle whereby said cakes may be turned and deposited with the iced face up.

8. The combination, in an icing machine, of an icing tank, means for feeding cakes thereto, a frame within said tank capable of vertical movement and carrying pins whereby cakes dropped onto the top of said icing may be lifted by the engagement of said pins, and a reciprocatory arm for lifting said cakes from the carrier and turning them with the iced face up.

9. The combination, in an icing machine, of means for feeding cakes to an icing bath, means for removing said cakes from the icing bath and turning them to bring their iced faces uppermost, a delivery belt onto which said cakes are discharged, a conveyer belt receiving the cakes from said delivery belt, and means for synchronously imparting intermittent movement to the several belts and the cake lifting and turning means.

10. The combination, in a cake coating machine, of means for floating cakes on the surface of an icing bath, a frame disposed in said bath, pins carried by said frame, and means for raising said frame so as to lift the cakes from the surface of the icing on the points of said pins.

11. The combination, in a cake coating machine, of a slatted apron for feeding cakes to the surface of an icing bath, a pin frame for lifting said cakes from the icing, and independent means for removing the cakes from the lifting means in the arc of the circle and depositing them upon a conveyer with the iced face uppermost.

12. The combination, in a cake coating machine, of means for feeding cakes to the surface of an icing bath, a pin frame for lifting said cakes from the icing, means for operating said frame, and independent means co-acting therewith for removing said cakes, turning them and depositing the same with their iced face uppermost upon a conveyer.

13. The combination, in a cake coating machine, of means for intermittently feeding cakes to the surface of a bath of icing, means for positioning said cakes on the surface of the icing, means within the icing for lifting said cakes from the surface of the same, and means for removing said cakes from the lifting means and depositing them upon a conveyer belt.

14. The combination, in a cake coating machine, of means for feeding cakes, provision for floating said cakes on the surface of a bath of icing, a pin frame for lifting said cakes from the icing, rods carrying said frame, cams for operating said rods, and independent means for removing said cakes from the lifting means turning them and depositing the same upon the conveyer.

15. The combination, in a cake coating machine, of means for feeding cakes, provision for floating them on the surface of a bath of icing, means within the icing bath for lifting said cakes from the surface of the same, cams for operating said means, means for removing the cakes from said lifting means, said latter means serving to turn and deposit the cakes with the iced face uppermost upon conveying means, and means for operating the turning means to pass beneath and remove the cakes from the lifting means.

16. The combination, in a cake coating machine, of means for feeding the cakes, an icing receptacle in which said cakes may float, means for raising said cakes from the surface of the icing, cams for operating said means, means for separating said cakes from the lifting means and turning them, and means for actuating said turning means.

17. The combination, in a cake coating machine, of means for feeding the cakes, an icing receptacle to which said cakes are delivered, means working within said icing receptacle for raising them from the surface of the icing, said means comprising a frame having pins to engage the cakes from beneath, means for operating said frame, and independent means having pins for removing said cakes from the lifting means reversing them and dropping them onto a conveyer.

18. The combination, in a cake floating machine, of a feeding belt having means whereby the cakes are spaced equidistantly apart when fed, an icing receptacle to which said cakes are fed, a frame movably disposed within said icing receptacle, pins carried by said frame, said frame and pins being normally below the surface of the icing when the cakes are fed thereto, means for raising said frame whereby the pins carried thereby will lift the cakes, arms arranged to sweep between the pins of the frame, and pins carried by said arms for removing the cakes from the lifting means whereby said cakes may be turned and deposited with the iced face up.

19. The combination, in an icing machine, of an icing tank, means for feeding cakes thereto, a frame within said tank capable of vertical movement, pins carried by said frame whereby cakes dropped onto the top of the icing may be lifted, arms for lifting said cakes from the carrier and turning them with the iced face up, said arms carrying pins, and means for rotating said arms.

20. The combination, in a cake icing machine, of means for floating cakes on the surface of an icing bath, a frame mounted in said bath, two sets of pins carried by said frame, and means for lifting said frame so as to pick up the cakes on the points of one set of said pins, the other set of pins carried by said frame being elongated to prevent the cakes moving out of range of the vertical movement of the frame.

In testimony whereof, we have signed our names to this specification, in the presence of the subscribing witnesses.

PEMBROKE D. HARTON.
CHARLES F. CRELIER.

Witnesses to the signature of Pembroke D. Harton:
MURRAY C. BOYER,
WM. A. BARR.

Witnesses to the signature of Charles F. Crelier:
HEBER C. DUVALL,
FRANK WILLERT.